(12) United States Patent
Welle et al.

(10) Patent No.: US 12,487,323 B2
(45) Date of Patent: Dec. 2, 2025

(54) CASCADABLE RADAR ELEMENT WITH TRANSMIT ANTENNA AND RECEIVE ANTENNA

(71) Applicant: VEGA Grieshaber KG, Wolfach (DE)

(72) Inventors: Roland Welle, Hausach (DE); Levin Dieterle, Oberwolfach (DE); Joerg Boersig, Schapbach (DE)

(73) Assignee: VEGA Grieshaber KG, Wolfach (DE)

( * ) Notice: Subject to any disclaimer, the term of this patent is extended or adjusted under 35 U.S.C. 154(b) by 148 days.

(21) Appl. No.: 18/264,808

(22) PCT Filed: Mar. 2, 2021

(86) PCT No.: PCT/EP2021/055157
§ 371 (c)(1),
(2) Date: Aug. 9, 2023

(87) PCT Pub. No.: WO2022/184238
PCT Pub. Date: Sep. 9, 2022

(65) Prior Publication Data
US 2024/0310476 A1    Sep. 19, 2024

(51) Int. Cl.
*G01S 7/02* (2006.01)
*G01S 7/03* (2006.01)
*G01S 13/42* (2006.01)
*H01Q 1/22* (2006.01)

(52) U.S. Cl.
CPC .............. *G01S 7/028* (2021.05); *G01S 7/032* (2013.01); *G01S 13/42* (2013.01)

(58) Field of Classification Search
CPC ........... G01S 7/028; G01S 7/032; G01S 13/42
See application file for complete search history.

(56) References Cited

U.S. PATENT DOCUMENTS

| | | | |
|---|---|---|---|
| 2016/0146931 A1* | 5/2016 | Rao | G01S 13/931 342/59 |
| 2017/0363714 A1 | 12/2017 | Rao et al. | |
| 2019/0107426 A1 | 4/2019 | Welle et al. | |
| 2019/0107427 A1 | 4/2019 | Waelde et al. | |
| 2020/0025899 A1 | 1/2020 | Starzer et al. | |
| 2020/0217922 A1 | 7/2020 | Mayer et al. | |

(Continued)

FOREIGN PATENT DOCUMENTS

| | | |
|---|---|---|
| CN | 110940957 A | 3/2020 |
| CN | 110940957 B | 3/2020 |
| DE | 10 2018 117 688 A1 | 2/2019 |

(Continued)

OTHER PUBLICATIONS

International Preliminary Report on Patentability and Written Opinion issued Sep. 14, 2023 in PCT/EP2021/055157, 11 pages.

(Continued)

*Primary Examiner* — Anh Q Tran
(74) *Attorney, Agent, or Firm* — Oblon, McClelland, Maier & Neustadt, L.L.P.

(57) ABSTRACT

A cascadable radar element for use in a radar measuring device for carrying out a digital beam transformation process, having at least one transmitting antenna and at least one receiving antenna which are integrated in the radar element, as well as an input connection and an output connection for local oscillator signals.

16 Claims, 7 Drawing Sheets

(56) References Cited

U.S. PATENT DOCUMENTS

2020/0301001 A1    9/2020  Starzer et al.
2020/0386854 A1*  12/2020  Melzer .................... G01S 7/032

FOREIGN PATENT DOCUMENTS

| DE | 10 2019 202 144 A1 | 8/2020 |
| DE | 10 2019 115 107 B3 | 9/2020 |
| EP | 3 467 448 A1 | 4/2019 |
| EP | 3 467 450 A1 | 4/2019 |
| EP | 3 719 533 A1 | 10/2020 |
| WO | WO 2019/001817 A1 | 1/2019 |

OTHER PUBLICATIONS

International Search Report mailed on Nov. 23, 2021 in PCT/EP2021/055157 filed on Mar. 2, 2021 (2 pages).

* cited by examiner

CASCADABLE RADAR ELEMENT WITH TRANSMIT ANTENNA AND RECEIVE ANTENNA

FIELD OF INVENTION

The invention relates to the technical field of radar measurement technology, in particular in the field of process automation in industrial and private environments. In particular, the invention relates to a cascadable radar element arranged for use in a radar measurement device for carrying out a digital beam transformation process, a radar measurement device comprising such a radar element, and certain uses.

TECHNICAL BACKGROUND

In level measurement, multi-dimensional measuring, i.e. two- or three-dimensional measuring radar systems can be used. New, advantageous applications have emerged, particularly in the field of process automation in industrial and private environments and in the area of factory automation. For example, three-dimensional measuring radar systems can be used for the measurement of bulk material stockpiles or for microwave barriers.

Furthermore, integrated radar chips (RSoC's) are known, which have a multitude of digital and analog components for the implementation of several radar transmit channels (Tx) and/or radar receive channels (Rx). On the basis of these RSoC's, which are set up for external connection of several transmit antennas and/or receive antennas, larger virtual array antennas can be synthesized by clever positioning of the individual antennas, the signals of which in turn form the basis for carrying out digital beamforming.

Frequencies above 80 Ghz represent a major challenge in terms of positioning accuracy and synchronization.

SUMMARY

It is an object of the present invention to provide a large aperture radar measuring device.

This object is solved by the features of the independent claim. Further embodiments of the invention result from the dependent claims and the following description of embodiments.

A first aspect of the present disclosure relates to a cascadable radar element configured for use in a radar measurement device for performing a digital beam transformation process. The cascadable radar element includes one or more transmit antennas integrated within the cascadable radar element.

In addition, it has one or more receive antennas, which are also integrated in the cascadable radar element.

An input port in the sense of an input interface is provided, arranged to receive a first local oscillator signal, which is used to cascade a plurality of interconnected cascadable radar elements, i.e. to form from them a radar measuring device which can perform digital beam transformation.

In addition, the cascadable radar element has an output port in the form of an interface arranged to output a second local oscillator signal which is used to cascade a plurality of interconnected cascadable radar elements.

The at least one transmitting antenna and the at least one receiving antenna are set up to acquire measurement data (i.e., to transmit radar signals and to receive the reflected radar signals), which are provided to perform the digital beam transformation process.

"Cascadable" in the context of the present disclosure means that the individual radar elements can be interconnected or daisy-chained to form an array having a plurality of transmitting and/or receiving antennas. By interconnecting the radar elements with each other, two- or three-dimensional beam steering with high resolution can be achieved.

The terms "input port" and "output port" are to be interpreted broadly.

Thus, according to an embodiment, a cascadable radar element is specified which is set up for acquiring data for carrying out a digital beamforming method, having at least one transmitting antenna, this being permanently embedded in the cascadable radar element, at least one receiving antenna, this being permanently embedded in the cascadable radar element, at least one wired or wireless connection for outputting a local oscillator signal, arranged for cascading a plurality of radar elements, and at least one wired or wireless connection for inputting a local oscillator signal, arranged for cascading a plurality of radar elements, wherein the at least one transmitting antenna and the at least one receiving antenna are arranged for acquiring data which can be used for carrying out a digital beamforming method.

In particular, the virtual antenna array of the radar element resulting from the arrangement of the transmitting and receiving antennas can thus be larger than the outer dimensions of the radar element, and thus a direct and gapless alignment of the virtual antenna arrays can be made possible by a corresponding arrangement of at least two radar elements.

According to a further embodiment, the at least one transmitting antenna and the at least one receiving antenna are permanently embedded in the cascadable radar element. They are not separate components.

According to a further embodiment of the present disclosure, the at least one transmitting antenna and/or the at least one receiving antenna are arranged close to the edge of the corresponding radar element in such a way that all mutually adjacent transmitting antennas of two mutually adjacent radar elements (can) have the same distance from one another and/or all mutually adjacent receiving antennas of two mutually adjacent radar elements (can) have the same distance from one another.

This property may also be referred to as translational periodicity. According to one embodiment, the transmit antennas of the radar elements form a fully populated virtual array of n virtual antenna positions in at least a first direction, where n is a natural number.

A core aspect of the present disclosure can be seen in proposing a novel radar element with integrated antennas, which is suitable to provide, after interconnection with a predeterminable number of similar radar elements, an overall system, which makes it possible to detect a plurality of signals in order to form therefrom a larger virtual overall array antenna, and on the basis of this to be able to perform a beam forming process with high angular resolution.

The cascadable radar element can be in the form of a radar chip with integrated antennas and can be extended to larger systems by appropriate arrangement on a carrier material. These can be used to create virtual antenna arrays with a large aperture.

By eliminating the need for external antennas, low-cost radar systems can be realized which, thanks to the specified cascadability, can be simultaneously expanded into high-resolution radar systems.

According to a further embodiment of the present disclosure, the cascadable radar element comprises a first transmitting antenna and a second transmitting antenna arranged at a distance from each other corresponding to the number of receiving antennas multiplied by the distance between two adjacent receiving antennas. According to a further embodiment, the cascadable radar element has a plurality of receive antennas arranged at a distance from each other corresponding to half the wavelength lambda ($\lambda$) of the radar signal.

According to another embodiment, the transmit antennas and the receive antennas are arranged along lines that are parallel to each other.

According to another embodiment, the transmit antennas and the receive antennas are arranged along lines perpendicular to each other.

According to a further embodiment, the cascadable radar element comprises a first transmitting antenna and a second transmitting antenna arranged at a distance from each other corresponding to half the wavelength A of the radar signal.

According to another embodiment, the cascadable radar element has a (dedicated) radar chip that generates the radar signals.

According to an embodiment, the arrangement has cascadable radar elements with at least one transmitting and at least one receiving antenna arranged in the chip or package (AoC and AiP, respectively), whose virtual individual arrays,
  at least in a first dimension consist of n virtual antenna positions and have a distance of $d_n \leq \lambda/2$,
  at least in a second dimension consist of m virtual antenna positions and have a distance of $d_m \leq \lambda/2$,
where the outer dimension of the radar element is
  at least in a first dimension $\leq n \cdot d_n$,
  at least in a second dimension $\leq m \cdot d_m$,
and which are arranged to acquire data for performing a digital beamforming process, wherein at least two adjacent radar elements
  have a distance or lateral offset at least along a first dimension from $n \cdot d_n$.
  at least along a second dimension have a distance or lateral offset of $m \cdot d_m$ along at least a second dimension.

According to a further embodiment, the cascadable radar element comprises a memory element for storing acquired digital reflectance values, a first digital interface arranged for outputting data of the memory element, and a second digital interface arranged for reading in digital data of another radar element.

According to a further embodiment, the cascadable radar element comprises a memory element for storing acquired digital reflectance values, an addressing unit which assigns a defined digital address to the radar element, a digital bus interface arranged for connecting the radar element to a digital bus, and an addressing logic for evaluating address information transmitted via the digital bus, wherein the radar element is arranged for transmitting data to and/or from the memory element via the digital bus interface.

Another aspect of the present disclosure relates to a radar measurement device having a carrier and an array of cascadable radar elements disposed on the carrier, particularly those described above and below.

According to another embodiment, the receive antennas of the radar elements form a fully populated virtual array of m virtual antenna positions in at least one direction, where m is a natural number.

According to another embodiment, the transmit antennas of the radar elements form a fully populated virtual array of n virtual antenna positions in at least a first direction, where n is a natural number.

According to a further embodiment, the radar measuring device is a level radar measuring device that is set up to determine the level in a container.

According to a further embodiment, the radar measuring device is a distance or limit radar measuring device that is set up for process automation in industrial or private environments.

According to another embodiment, the carrier has a square shape.

Another aspect of the present disclosure relates to the use of a radar measuring device described above and below, or a plurality of interconnected cascadable radar elements described above and below, for level measurement or level limit measurement, for object monitoring, or for a reflective microwave barrier.

Further embodiments of the present disclosure are described below with reference to the figures. If the same reference signs are used in the following description of figures, these designate the same or similar elements. The representations in the figures are schematic and not to scale.

DETAILED DESCRIPTION OF EMBODIMENTS

Figure 1:
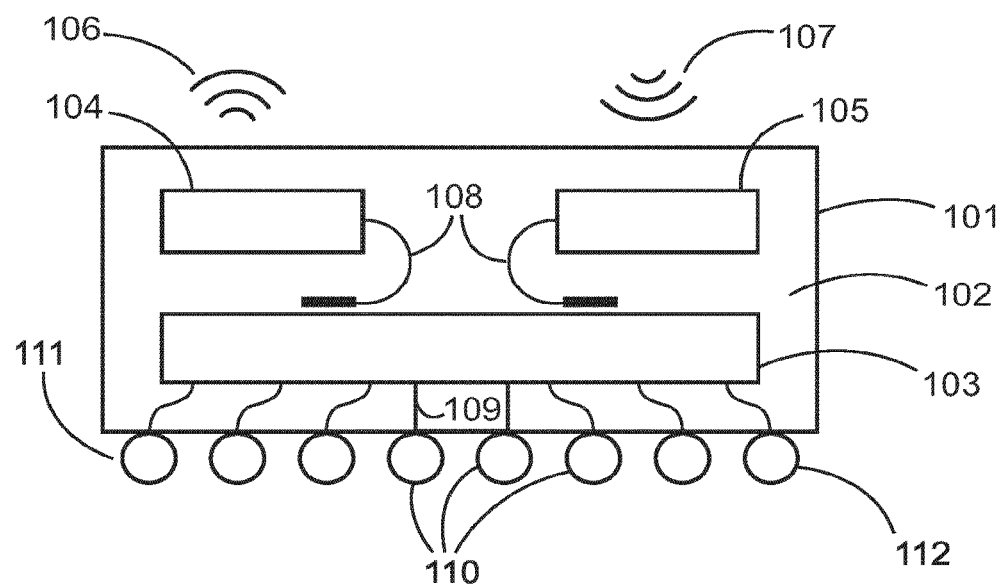
FIG. 1 shows a cascadable radar element according to an embodiment.

FIG. 1 shows a radar element 101. In a first embodiment, the radar element 101 may be an electronic component 101 comprising a package 102 in which at least one semiconductor chip 103 is integrated. The semiconductor chip may include various circuit parts for generating and/or processing radio frequency signals. In particular, the semiconductor chip 103 may be a gallium arsenide semiconductor, a silicon-germanium semiconductor, or a BiCMOS or RF- CMOS semiconductor, which is suitable for implementing circuits for processing high-frequency signals. The package 102 may, for example, be based on a plastic material or other dielectric molding material. The semiconductor chip 103 is connected via electrically conductive connections 108, for example bonding wire connections 108 to at least one antenna 104, 105 (AIP, Antenna in Package) also integrated in the package 102, which in turn is suitable for radiating 106 and/or detecting 107 radar signals. The semiconductor chip 103 is connected via further electrically conductive connections 109, for example bonding wires 109, to contact points 110, for example the balls 110 of a BGA package, provided on the outside of the radar element 101. In order to be able to cascade several radar elements 101, the device 101 has at least one contacting possibility 111 for introducing an external local oscillator signal LO_IN with a frequency above 1 GHZ, and at least one further contacting possibility 112 for outputting an internal local oscillator signal LO_OUT, the frequency of which may be above 1 GHz.

In particular, embodiment 101 may be advantageously used for radar frequencies in the range up to 120 GHZ, and in particular also for radar frequencies in the range around 80 GHz.

Cascading of multiple similar radar elements 101 may be accomplished by assembly, such as soldering onto a printed circuit board material.

Figure 2:
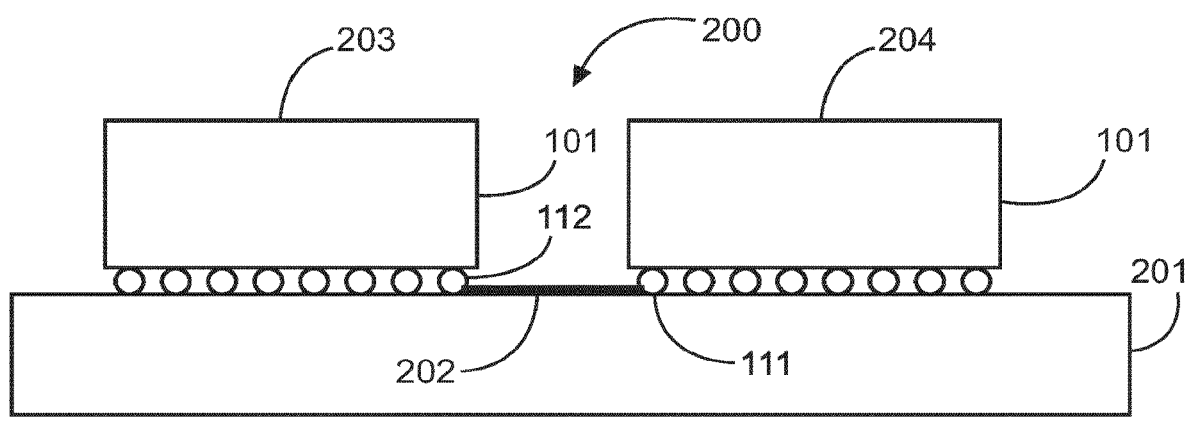
FIG. 2 shows an arrangement of two cascadable radar elements on a printed circuit board (carrier).

FIG. 2 shows a corresponding arrangement. In a further development, the electronic components 203, 204, which are both of the same type as the radar element 101, are interconnected on a suitable carrier material 201, for example a printed circuit board material 201, to form a cascaded radar system 200. It is characteristic here that the two radar chips are operated together in an operating phase. In this case, it is provided in particular that radar signals are emitted with a first element 203 and received again with a first element 203 and/or a second element 204. The synchronization of the two units 203, 204 required for this is performed by forwarding a local oscillator signal used in the first radar chip 203, which can be forwarded to an input point LO_IN 111 of the second component 204 via an output contact LO_OUT 112 of the first component 203 and a conductor track 202, which can be applied to the circuit board 201.

Figure 3:
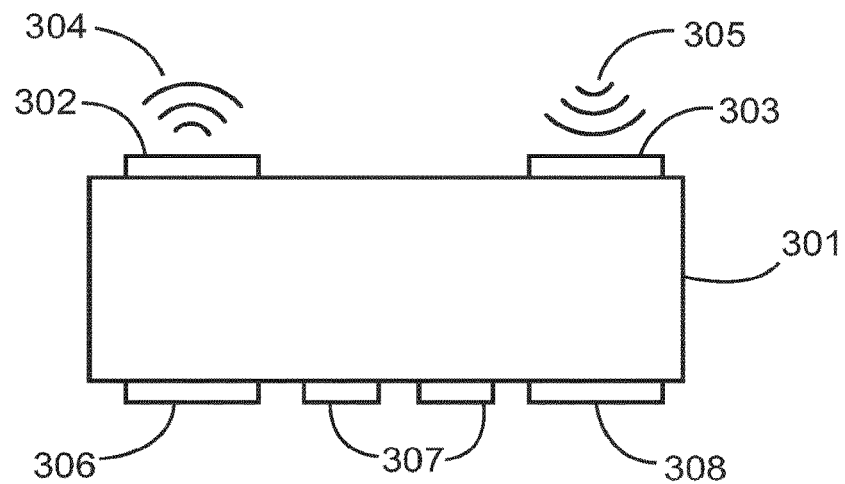
FIG. 3 shows a cascadable radar element according to a further embodiment.

FIG. 3 shows a further embodiment of a radar element 301. The second embodiment 301 shown may be a semiconductor chip 301 or a semiconductor wafer 301 which, in addition to the circuits for generating and/or processing radar signals, also has antennas or primary radiators 302, 303 (AoC, Antenna on Chip) integrated in or on the semiconductor wafer 301 for radiating 304 and/or detecting 305 radar signals. The semiconductor chip 301 may be, in particular, a gallium arsenide semiconductor, a silicon-germanium semiconductor, or a BiCMOS or RF-CMOS semiconductor, which is suitable for implementing circuits for processing high-frequency signals. The semiconductor chip 301 is adapted to be connected to other conductive surfaces or semiconductor chips via electrically conductive bonding pads 306, 307, 308, for example metallized bonding pad contactable pads 306, 307, 308. In order to be able to cascade several radar elements 301, the chip 301 has at least one contacting possibility 306 for introducing an external local oscillator signal LO_IN with a frequency above 1 GHZ, and at least one further contacting possibility 308 for outputting an internal local oscillator signal LO_OUT, the frequency of which may be above 1 GHz.

This embodiment can be used advantageously in particular for radar frequencies in the range above 120 GHz, in particular also for radar frequencies in the range around 180 GHz or in the range around 240 GHz. It has been shown that the small structure widths and accuracies required for high frequencies can be realized very simply and inexpensively in the context of semiconductor manufacturing, in particular by etching processes.

Cascading of a large number of radar elements can be achieved by mounting several such semiconductor chips in one package.

Figure 4:
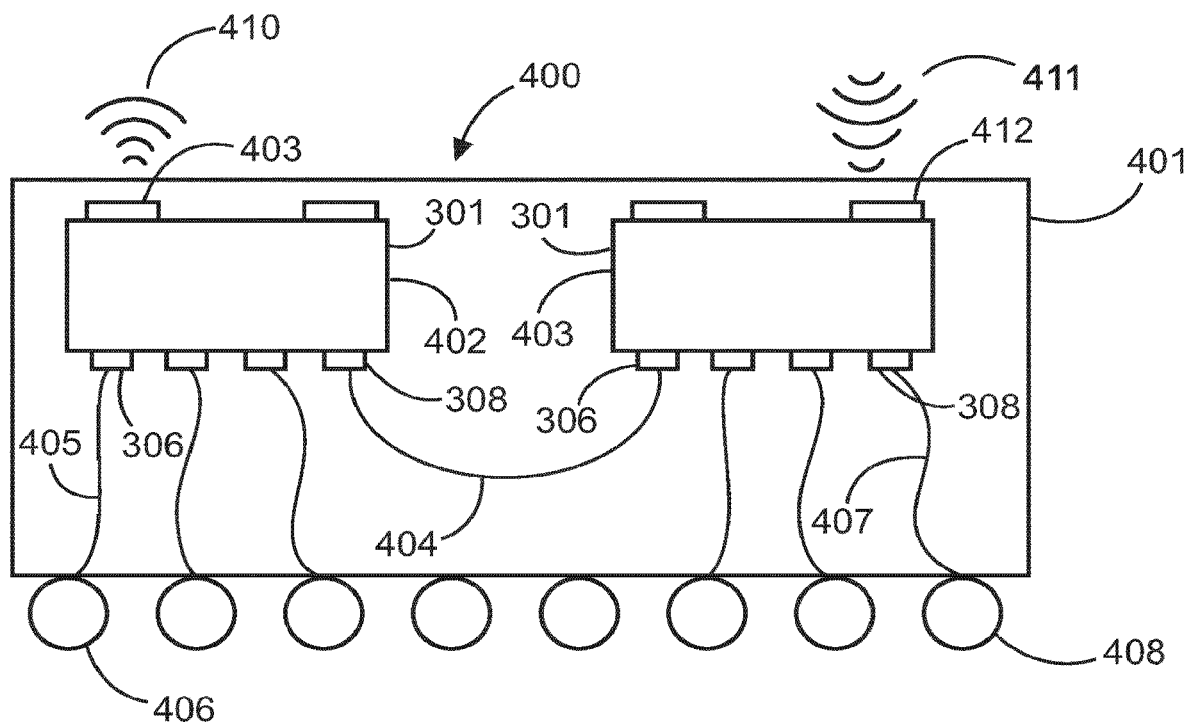
FIG. 4 shows an electronic component of a radar measuring device according to an embodiment.

FIG. 4 shows a corresponding structure. In a further development, the semiconductor chips 402, 403, which are both of the same type as the semiconductor chip 301, are interconnected in a chip package 401, for example a BGA package, a QFN package or other known package forms, to form a cascaded radar system 400. It is characteristic here that the two radar chips 402, 403 are operated together in an operating phase. In particular, it is intended that radar signals 410 are emitted by a first chip 402 via an antenna-on-chip element 409 and received again by a first chip 402 and/or a second chip 403 via an antenna 412 integrated thereon 411. The synchronization of the two semiconductor chips 402, 403 required for this purpose is performed by forwarding a local oscillator signal used in the first semiconductor chip 402, which can be forwarded via an output contact LO_OUT 308 of the first chip 402 to an input point LO_IN 306 of the second semiconductor chip 403 via a conductive connection 404. Alternatively, provision may be made for wireless transmission of the signals required for synchronization from a first semiconductor chip 402 to a second semiconductor chip 403. For this purpose, for example, a waveguide structure 404 or a dielectric waveguide 404 can be used, wherein the first semiconductor chip 402 is set up at connection 308 to couple an internal LO_OUT signal into the waveguide 404 or waveguide 404, and the second semiconductor chip 402 is set up to detect the LO_IN signal after it has been coupled out of the waveguide 404 or waveguide 404 at connection 306, and to use it internally for synchronization.

The electronic component 400 realized according to the scheme of FIG. 4 may thus comprise all antenna elements for beamforming, and be further processed directly on a printed circuit board material. It may also be complementarily provided to arrange several radar elements 400 on a printed circuit board 201 to enable further cascading (on a higher level), and thus to bring about a further increase in the number of radar channels and thus a further increase in the angular resolution in the digital beamforming. For this purpose, the device 401 comprises at least one port 406 for externally supplying a local oscillator signal LO_IN, which is forwarded to a corresponding port 306 of the first semiconductor chip 402 via a connection 405. Furthermore, the component has a further contacting possibility 408, which can provide an internal local oscillator signal LO_OUT to the outside via a connection 407.

The arrangement in FIG. 4 shows a first exemplary embedding in a component housing 401, for example a chip housing 401. Other arrangements with a large number of integrated (unhoused) radar chips 301 are also possible for specific applications. Since the cascadable radar elements with integrated antennas 301 that can be used for this purpose are always technically identical, there is the advantage of being able to produce these radar chips or semiconductor chips very inexpensively by mass production.

Nevertheless, different types of application-specific components 401 can be derived from them by means of different forms of packaging.

Figure 5:
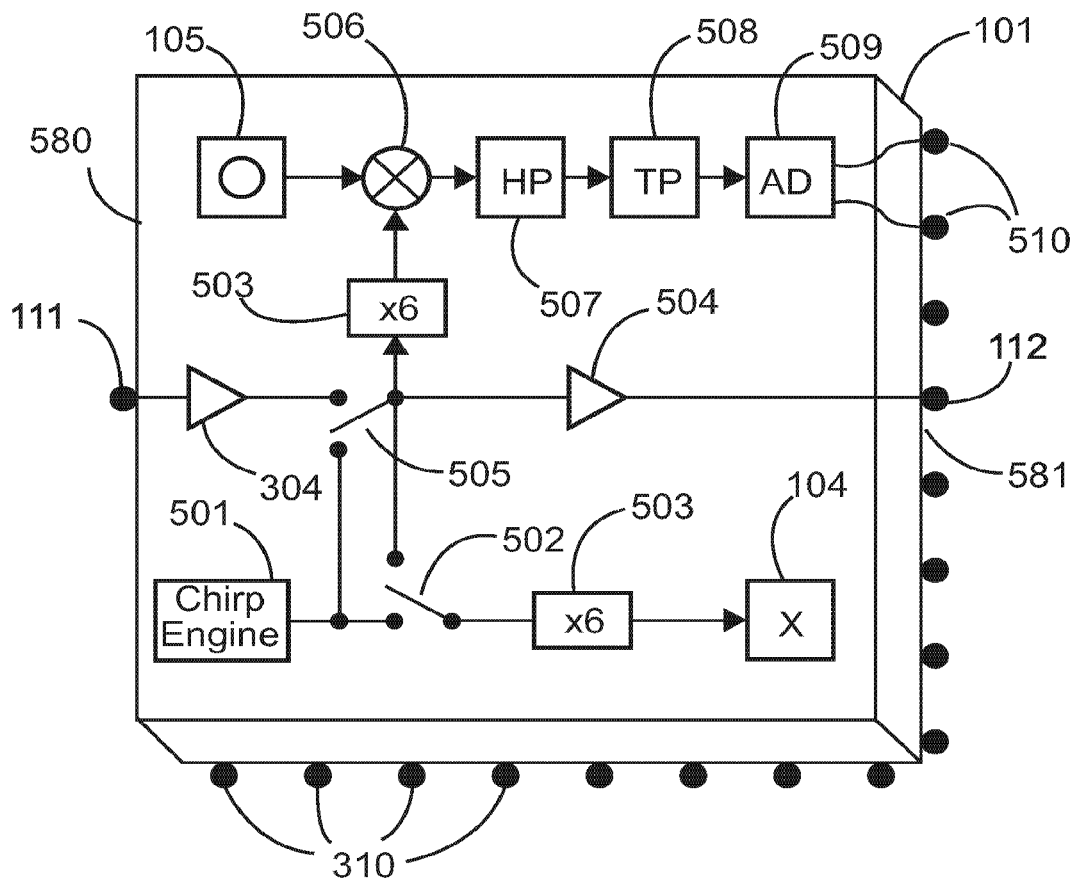
FIG. 5 shows a block diagram of the circuit of a cascadable radar element according to an embodiment.

FIG. 5 shows a block diagram of a possible circuit implementation of a cascadable radar element 101, 301, which has both a transmitting antenna X 104 and a receiving antenna O 105. In addition, an external LO_IN signal can be supplied to the radar element 101 via a first contacting area 111, for example a ball 111 of a BGA package, and an internal LO_OUT signal can be provided to the outside via a second contacting area 112. Via amplifiers 504, the LO signal can be amplified in level. In this way, losses in the signal amplitude of an LO signal caused by the length of the LO line 202, 404 between two radar elements can be compensated. The selection switch 502 can be used to set whether the LO_IN signal is to be fed to the transmitting antenna X 104 via the multiplier 503, or whether a separate LO signal is to be generated by the chirp engine 501 and radiated after multiplication 503. The further selection switch 505 can be used to set whether the local oscillator signal generated by the chirp engine 501 is to be fed to the receive mixer 506, or whether the external LO_IN signal of the contacting area 111 is to be used instead. The high frequency signal received via the receiving antenna O 105 is converted into a low frequency signal in the mixer 506. Optionally, in a particularly advantageous embodiment, the signal may be processed by the high-pass filters 507 and low-pass filters 508 and finally digitized by an A/D converter 509. The sampled signal may be provided externally in digital form via one or more of the contacting means 510.

In particular, it may be intended to provide a cascadable radar element that can be used to acquire data for performing a digital beamforming process. In the prior art, different antenna arrangements are known which enable the implementation of a digital beamforming process. In order to achieve high-quality signal processing results, it is regularly proposed there to arrange antennas in such a way that these result in a virtual antenna array, the elements of which are ideally arranged in an equidistant grid, with the spacing of the elements corresponding to a distance at most smaller than or equal to half the wavelength of the radar signal used.

Figure 6:
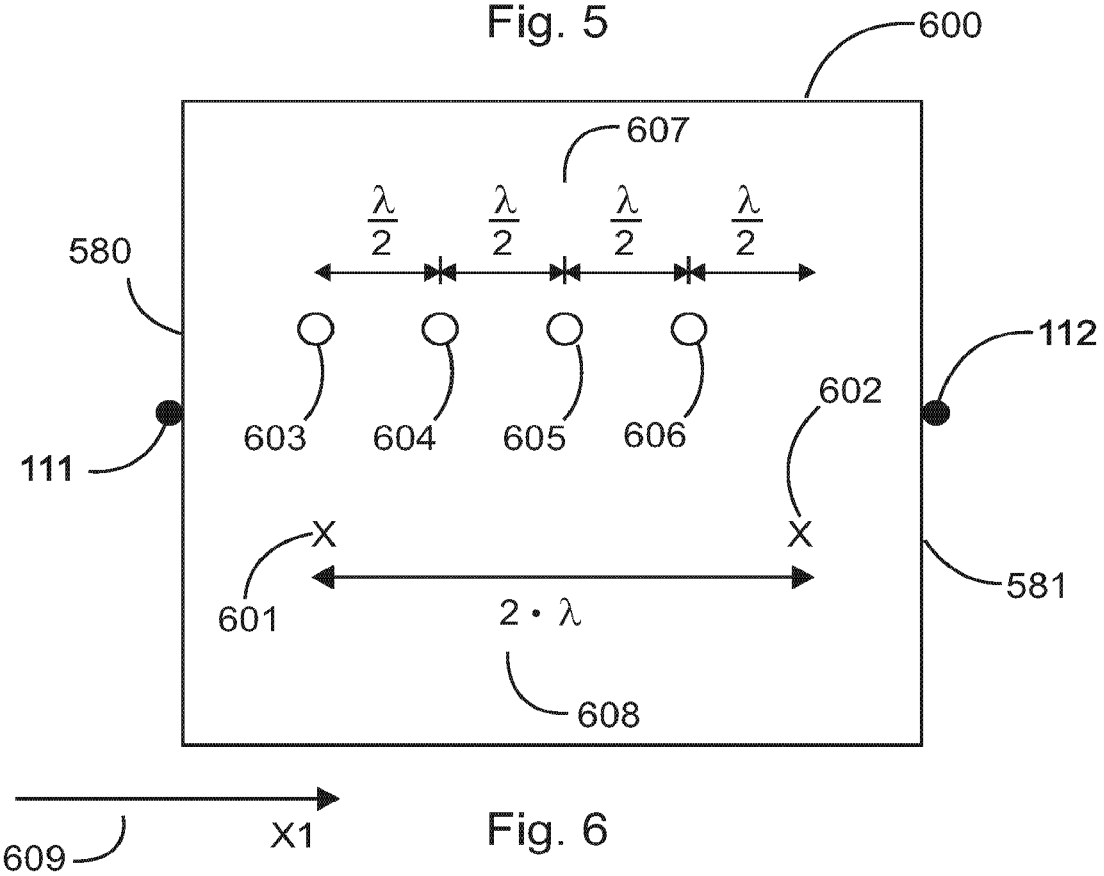
FIG. 6 shows the arrangement of transmitting and receiving antennas of a cascadable radar element according to an embodiment.

FIG. 6 shows an example of a suitable arrangement of two transmit antennas X 601, 602 and four receive antennas O 603, 604, 605, 606 on the upper side of a cascadable radar element 600. As already disclosed, the radar element 600 has a first contacting area LO_IN 111 and a second contacting area LO_OUT 112, which allow several radar elements 600 to be interconnected. The four receiving antennas are arranged along a first dimension X1 609 at a distance 607 corresponding to half the wavelength lambda of the radar signal used. The two transmit antennas X 601, 602 are arranged along a first dimension X1 609 at a distance 608, which results from the number of receive antennas multiplied by the distance between two adjacent receive antennas.

In particular, the embodiment 600 shown provides a simple way to implement one-dimensional beamforming radar systems.

The at least one transmitting antenna 601, 602 and/or the at least one receiving antenna 603, 604, 605, 606 are arranged close to the edge 580, 581 of the corresponding radar element in such a way that all mutually adjacent transmitting antennas of two mutually adjacent radar elements 702, 703 can have the same distance from one another and/or all mutually adjacent receiving antennas of two mutually adjacent radar elements 702, 703 can have the same distance from one another.

Figure 7:
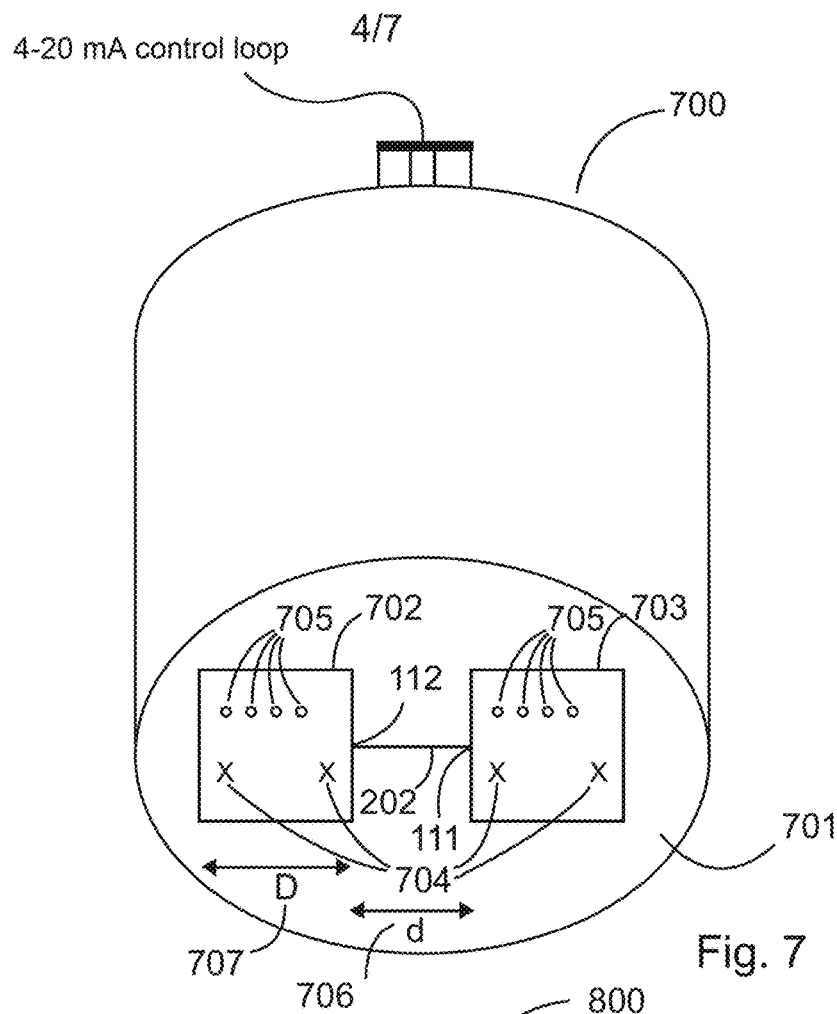
FIG. 7 shows the arrangement of two cascadable radar elements according to an embodiment.

FIG. 7 illustrates the use of a radar element 600 to construct a one-dimensional sensor 700 covered by the present disclosure, for example for area monitoring. The range monitoring sensor 700 is designed for digital beam forming along a first dimension X1 609. For this purpose, it has two cascadable radar elements 702, 703 on its antenna surface 701, both of which are to be in the form of the radar element 600. The two radar elements 702, 703 are synchronized with each other via a connection line 202, for example a printed circuit board line 202. In order that the radar elements 702, 703 are protected from environmental influences, it can also be provided that they are protected by an additional mounting of a cover (radome), which is not shown here.

The respective mounting position of the radar elements 702, 703 relative to each other is selected in such a way that a virtual antenna array can be synthesized using the transmit antennas 704 and the receive antennas 705 in a manner known to the skilled person, which in a particularly advantageous embodiment has equidistant antenna positions with full occupancy, i.e. in particular has no aperture gaps. For this purpose, the mounting positions of the two radar elements 702, 703 must in particular not be too far apart. The maximum permissible distance d 706 to be realized in this case between at least two adjacent radar elements 702, 703 must be smaller than or equal to the extent D 707 of a radar element along the first axis X1 609. This follows from the fact that a virtual array generated by an antenna array can be at most twice as large as the physical extent of the underlying antenna array. If this is taken into account, the virtual arrays of at least two adjacent radar elements can be lined up without gaps and thus aperture gaps, which can worsen the result of beamforming, can be avoided. The previously mentioned relationships apply regardless of the specific positioning of the transmit antennas 704 as well as the receive antennas 705.

It may also be provided to position the contacting surfaces for LO_IN 111 and LO_OUT 112 on opposite sides of the radar element 600. In this way, a particularly short cable routing 202 for the LO signal can be achieved in a linear cascading of several radar elements 600.

It should also be noted at this point that further radar elements 600 can be added in a linear arrangement according to the scheme of FIG. 7, which can help to further improve the angular resolution of a sensor 700.

Figure 8:
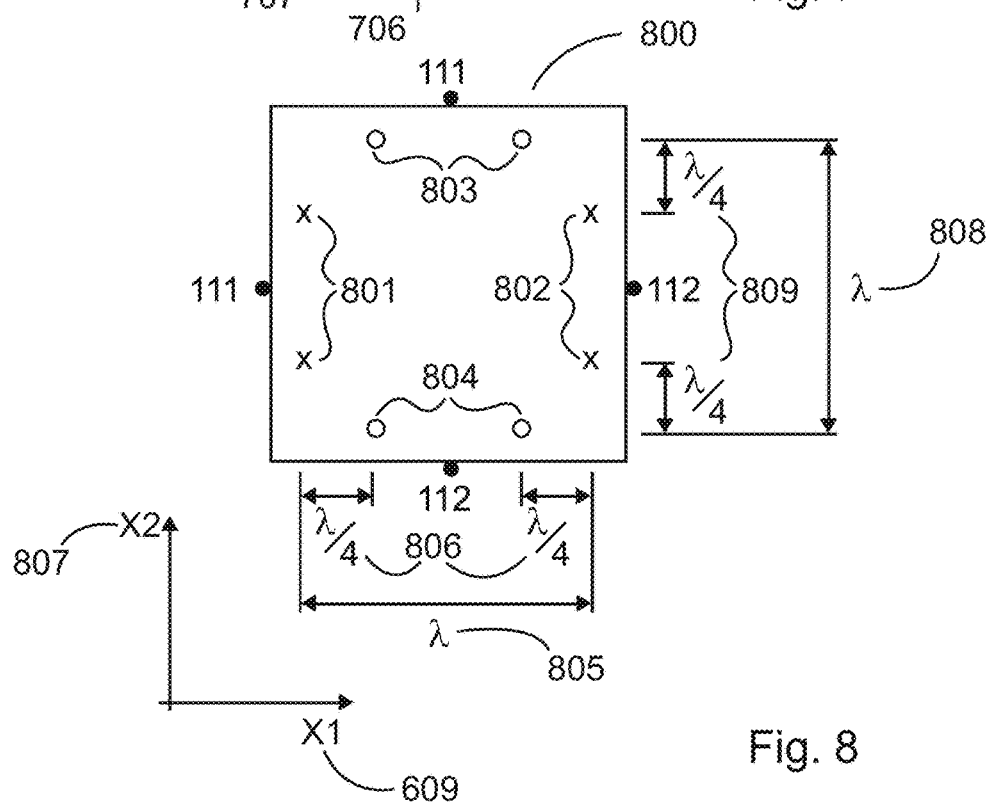
FIG. 8 shows a cascadable radar element according to an embodiment.

FIG. 8 shows an example of a further arrangement of transmit antennas X 801, 802 and receive antennas O 803, 804 on the upper side of a radar element 800. In contrast to the embodiment of FIG. 6, the embodiment 800 shown here can be used to acquire signals on the basis of which digital beamforming can be performed in two dimensions, i.e. in particular along a first dimension X1 609 and along a second dimension X2 803. In a particularly advantageous embodiment, the embodiment 800 may comprise two spaced-apart contacting surfaces LO_IN 111, which may be functionally identical. Furthermore, it may be provided that the radar element 800 is provided with two further contacting surfaces LO_OUT 112 spaced apart from each other, which may again be functionally identical to each other. In a particularly advantageous embodiment, it may furthermore be provided to arrange the contacting surfaces LO_IN 111 on two adjacent outer edges of the radar element 800, and to arrange the contacting surfaces LO_OUT 112 on two outer edges of the radar element 800 that differ therefrom but are nevertheless adjacent. This allows a particularly advantageous cascading of several radar elements 800.

The radar element 800 has four transmit antennas X 801, 802, a first group of transmit antennas 801 being spaced along a first dimension X1 609 from a second group of transmit antennas 802 by a distance 805 that is less than or equal to the wavelength of the radar signals used. In addition, the receiving antennas O 803, 804 are arranged in such a way that they maintain a minimum distance 806 of one quarter of the wavelength of the radar signals used along a first dimension X1 from the transmitting antennas X 801, 802.

The four receiving antennas O 803, 804 are arranged along a second dimension X2 807 in such a way that a first group of receiving antennas 803 has a distance 808 from a second group of receiving antennas 804 which is smaller than or equal to the wavelength of the radar signals used. In addition, the transmit antennas X 801, 802 are arranged in such a way that they maintain a minimum distance 809 of one quarter of the wavelength of the radar signals used along a second dimension X2 from the receive antennas O 803, 804.

Figure 9:
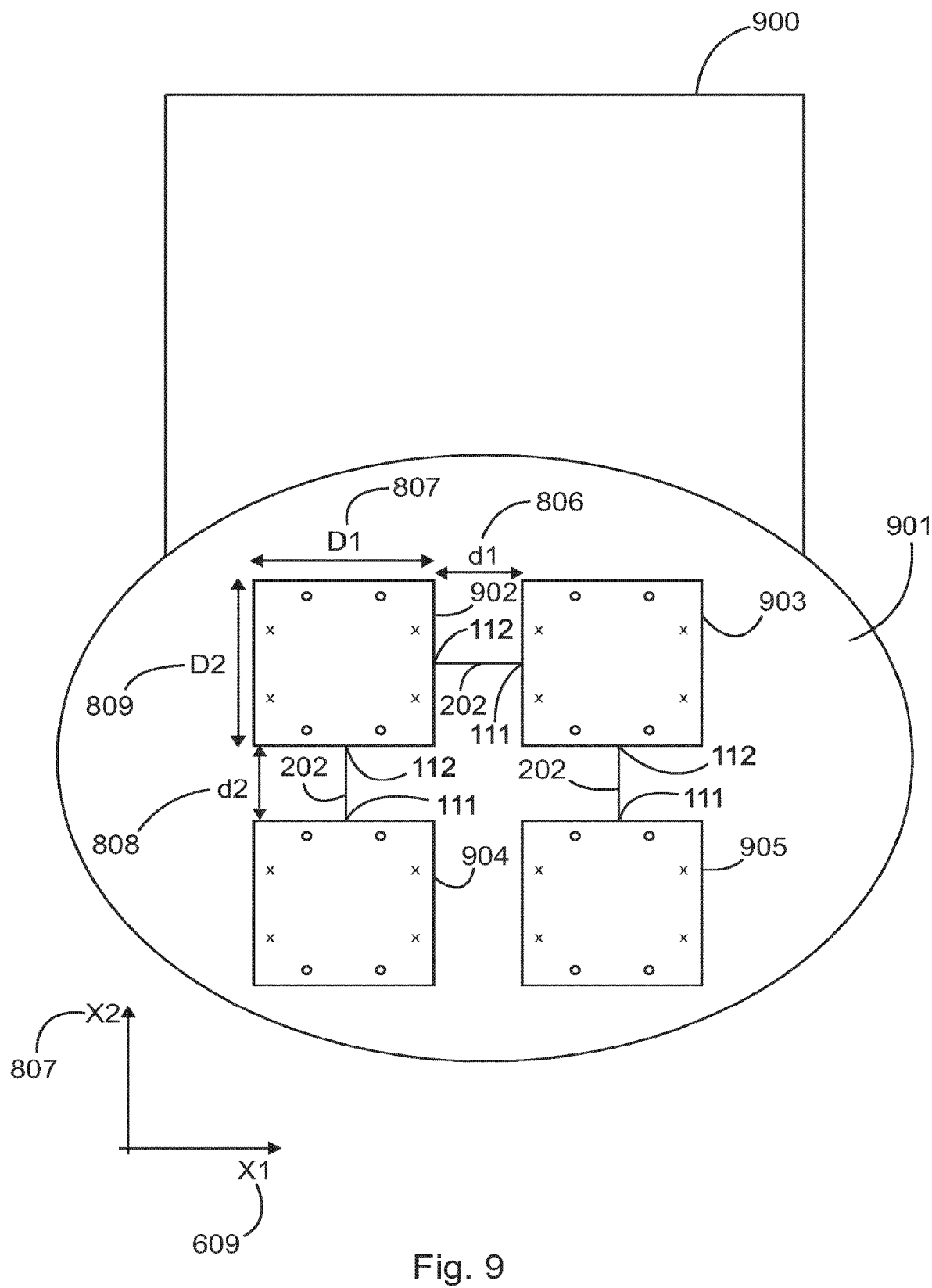
FIG. 9 shows the arrangement of four cascadable radar elements according to an embodiment.

In particular, the embodiment 800 shown is a simple way to implement two-dimensional beam-forming radar systems. FIG. 9 illustrates the use of a radar element 800 to construct a two-dimensional sensor 900 covered by the present disclosure, for example, to detect a topology in level measurement. The topology sensor 900 is designed for digital beam forming along a first dimension X1 609 and along a second dimension X2 807. For this purpose, it has on its antenna surface 901 four cascadable identically designed radar elements 902, 903, 904, 905, both of which are to be designed in the form of the radar element 800. The four radar elements 902, 903, 904, 905 are synchronized with each other via connection lines 202, for example printed circuit board lines 202. In order that the radar elements 902, 903, 904, 905 are protected from environmental influences, it can also be provided that they are protected by an additional mounting of a cover (radome), which is not shown here.

The respective mounting position of the radar elements 902, 903, 904, 905 relative to each other is selected in such a way that, using the transmit antennas 801, 802 and the receive antennas 803, 804, a virtual antenna array can be synthesized in a manner known to the skilled person, which in a particularly advantageous embodiment has equidistant antenna positions with at least partial full occupancy, i.e. in particular has no aperture gaps. For this purpose, the mounting positions of the radar elements 902, 903, 904, 905 in particular must not be too far apart. The maximum permissible distance d1 806 to be taken into account here between at least two radar elements 902, 903 and 904, 905 adjacent along a first dimension X1 609 must be less than or equal to the extent D1 807 of a radar element 800 along the first axis X1 609. In addition, provision must be made for the maximum permissible distance d2 808 between at least two radar elements 902, 904 and 903, 905 adjacent along a second dimension X2 807 to be less than or equal to the extent D2 809 of a radar element 800 along the second axis X2 807.

This follows from the fact that a virtual array generated by an antenna array can be at most twice as large as the physical extent of the underlying antenna array. If this is taken into account, the virtual arrays of at least two neighboring radar elements can be lined up without gaps and thus aperture gaps in the virtual array, which can worsen the result of beamforming, can be avoided. The aforementioned relationships apply regardless of the specific positioning of the transmit antennas 801, 802 and the receive antennas 803, 804 in general.

It can also be provided that the contacting surfaces for LO_IN 111 are double and on adjacent sides of the radar element 800 and LO_OUT 112 are double and on adjacent sides of the radar element, whereby LO_IN 111 and LO_OUT 112 are to be arranged on different sides of the radar element. In this way, a particularly short line routing 202 for the LO signal between two adjacent radar elements 800 can be achieved in the case of a checkerboard-like arrangement of a plurality of radar elements 800.

It should also be noted at this point that, according to the scheme of FIG. 9, further radar elements 900 can be added in a two-dimensional, checkerboard arrangement, which can help to further improve the angular resolution of a sensor 900.

The antenna arrangements described are to be considered only as exemplary embodiments, since a virtual antenna array without aperture gaps can be generated by a variety of different arrangements of radar elements.

With the disclosures made so far, cascading of radar elements can be achieved in a simple manner, whereby the received data detected by individual elements 101, 301 with the aid of at least one analog-to-digital converter 509 must be transmitted from each radar element 101, 301 via suitable digital interfaces into an evaluation module, for example a processor. On the side of available processors, however, the problem of a limited number of physically available interfaces arises here, especially if a large number of radar elements is to be cascaded, for example according to the scheme of FIG. 9.

Figure 10:
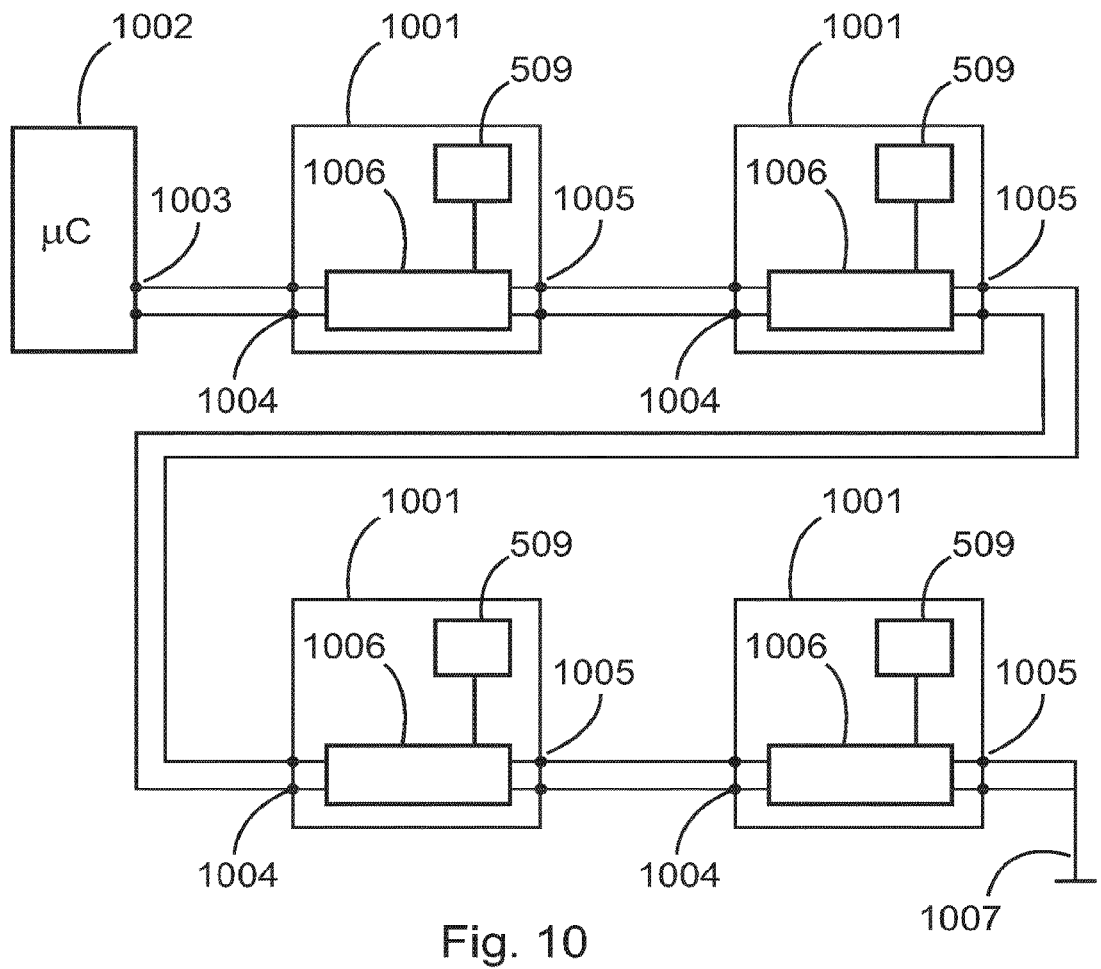
FIG. 10 shows the arrangement of four cascadable radar elements according to an embodiment.

In a further development, it can therefore be provided that the radar elements 101, 301 can also be designed to be cascadable with respect to a digital interface 510. FIG. 10 shows a corresponding example.

The system of FIG. 10 may exemplarily comprise four cascaded radar elements 1001. During at least one operating phase, the radar elements 1001 acquire digital measured values via at least one analog-to-digital converter 509, which are related to the acquired reflections of at least one radar reception channel 105, 506, 507, 508. The detected digital reflectance values are stored in a memory element 1006 of the radar chip. Since all radar elements can be operated simultaneously, after completion of a radar measurement, the data is stored in digital form in the memory elements 1006 of the radar chips.

In a subsequent readout phase, a processor 1002 can read out the memory element 1006 of the first radar chip via a first digital interface 1004. When data is output at a first digital interface 1004, the radar chips 1001 are designed to transfer the memory 1006 into a readout mode, which in particular implements a shift register mode, whereby the elements of the shift register that become free are filled with new values, which can be read in externally via a second digital interface 1005, in particular by a further radar chip 1001. Since the last radar chip 1001 of the cascaded chip arrangement fills the shift register 1006 with zeros via an appropriately executed termination 1007 when reading out the values of the shift register 1006, the processor 1002 can read in values via its interface 1003 until the sequence of zeros is detected, indicating that all data of all radar elements could be read in. From this point on, the actual digital beamforming can be started in different angular directions along a first dimension (cf. FIG. 7) and/or along a second dimension (FIG. 9), for example in the processor 1002.

The embodiment of FIG. 10 provides cascadable radar elements 1001, which allow to provide arbitrarily large systems with a plurality of cascaded radar elements 1001, independent of the number of interfaces 1003 of a processor.

Figure 11:
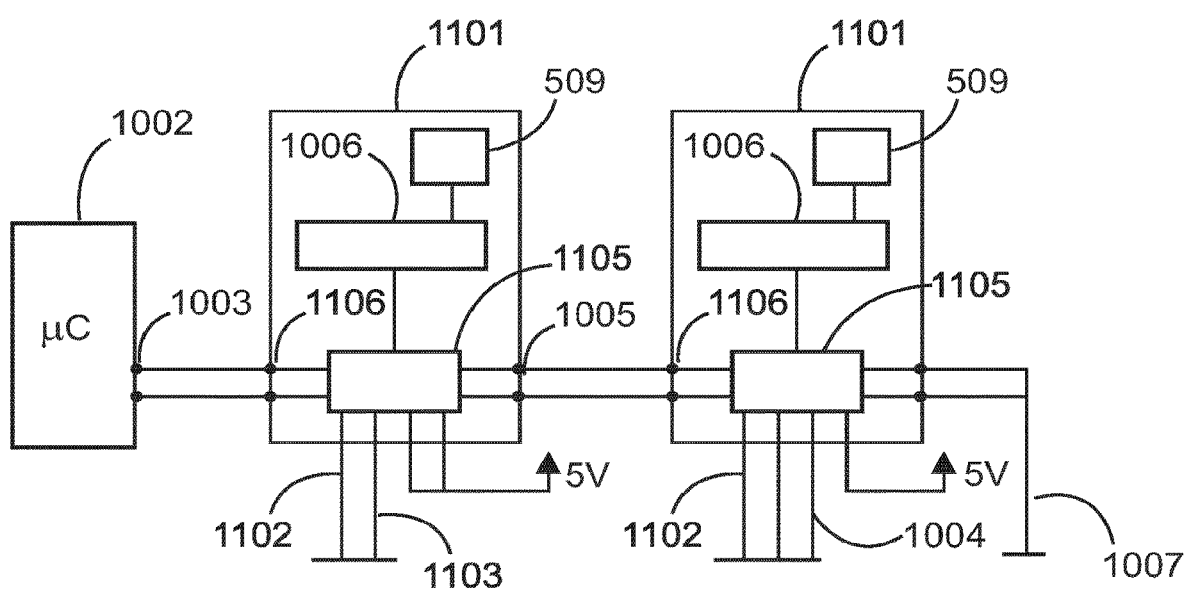
FIG. 11 shows another arrangement of cascadable radar elements according to an embodiment.

Alternatively or additionally, it may also be provided to provide the radar elements 1001 with a digital address, which may be provided by an addressing unit 1102. For this purpose, additional addressing pins 1102 may be provided in a first embodiment. FIG. 11 shows a corresponding example. When equipping the circuit boards 201, appropriately specified external wiring (high/low) 1103, 1104 of the pins 1102 ensures that each radar element 1001 is assigned a unique address. To read data from a radar element 1101, the processor 1002 can first transmit a destination address to a digital bus interface (1106) of the radar element via the digital interface 1003. An addressing logic 1105 integrated in the radar element 1101 first checks whether the data is to be output by its own radar element on the basis of the digital module address stored in the addressing unit 1102, which in this case is specified by the external circuitry 1103. If this is the case, the data is subsequently applied to the digital bus using the digital bus interface (1106) and output. Otherwise, the request is forwarded to the outside via the second digital interface 1005 and processed by the cascaded radar elements in the same way.

In this way, random access can be implemented when reading data from a selected radar element 1101, which can provide advantages in particular when performing a digital beamforming process in the processor system 1002, since the data need only be read into the memory of the processor system 1002 when it is actually needed there. Further, the introduction of digital addresses may also allow data to be transmitted from the processor 1002 to a particular radar element 1101. This may be intermediate results pre-processed by the processor system 1002 during digital beamforming. In this way, it can be achieved that the processor can use the memory modules 1006 of the radar elements as buffers. This results in the particular advantage that the processor 1002 does not have to grow with the number of radar elements, even in terms of its working memory. Instead, it is automatically expanded with further memory areas by the addition of further radar elements, and is thus enabled to perform larger evaluation calculations.

The additional addressing pins 1102 are a preferred embodiment of an addressing unit which has the general task of assigning a defined digital address to the radar chip via which it can be addressed in a bus system. Alternatively or additionally, other forms of address assignment can also be implemented in the addressing unit 1102, for example programmable addressing units.

Provision may also be made for the processor to transmit setting and/or parameterization values to selected radar elements 1101 via interface 1003.

The radar elements 1101 may also have specialized hardware units, for example for performing a fast Fourier transform, which may be selectively controlled by the processor system 1002. In this way, the performance of the resulting digital signal processing hardware also increases with each additional radar element 1101.

In another embodiment, not shown, of a sensor system 700, 900 using addressable, cascadable radar elements, provision may be made to connect the radar elements to the processor system using a defined address bus and a data bus separate therefrom. This can also provide random access when writing data to a particular radar element or reading data from a particular radar element.

Figure 12:
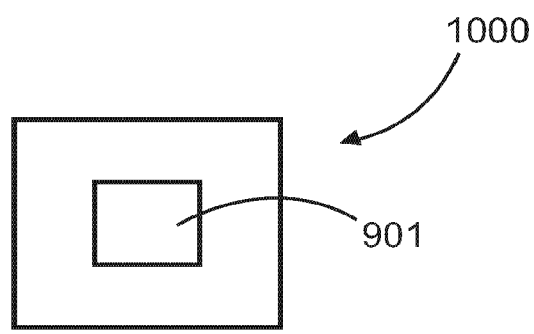
FIG. 12 shows a radar measuring device according to an embodiment.

FIG. 12. shows a radar measurement device 1000 that includes an array of cascadable radar elements with an antenna surface 901.

The term "process automation in the industrial environment" can be understood as a subfield of technology that includes measures for the operation of machines and plants without the involvement of humans. One goal of process automation is to automate the interaction of individual components of a plant in the chemical, food, pharmaceutical, petroleum, paper, cement, shipping or mining industries. A wide range of sensors can be used for this purpose, which are adapted in particular to the specific requirements of the process industry, such as mechanical stability, insensitivity to contamination, extreme temperatures and extreme pressures. Measured values from these sensors are usually transmitted to a control room, where process parameters such as level, limit level, flow rate, pressure or density can be monitored and settings for the entire plant can be changed manually or automatically.

A subfield of process automation in the industrial environment concerns the logistics automation of plants and the logistics automation of supply chains. Distance and angle sensors are used in the field of logistics automation to automate processes inside or outside a building or within a single logistics facility. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and location of an object is required by the respective application. Sensors based on optical measurement methods using lasers, LEDs, 2D cameras or 3D cameras that measure distances according to the time-of-flight (ToF) principle can be used for this purpose.

Another sub-area of process automation in the industrial environment concerns factory/production automation. Use cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

Supplementally, it should be noted that "comprising" and "having" do not exclude other elements or steps, and the indefinite articles "a" or "an" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A cascadable radar element for use in a radar measurement device for performing a digital beam transformation process, comprising:
   at least one transmitting antenna, which is integrated in the cascadable radar element;
   at least one receiving antenna, which is integrated in the cascadable radar element;
   an input terminal that receives a first local oscillator signal and is configured to cascade a plurality of interconnected cascadable radar elements; and
   an output terminal that outputs a second local oscillator signal and is configured to cascade a plurality of interconnected cascadable radar elements,
   wherein the at least one transmitting antenna and the at least one receiving antenna are configured to acquire measurement data which is used to carry out the digital beam transformation process,
   wherein the cascadable radar further includes:
   a memory element configured to store acquired digital reflectance values;
   an addressing circuit configured to assign a defined digital address to the radar element;

a digital bus interface arranged to connect the radar element to a digital bus; and an addressing logic configured to evaluate address information transmitted via the digital bus, wherein the radar element is adapted to transmit data to and/or the memory element via the digital bus interface.

2. The cascadable radar element according to claim 1, wherein the at least one transmitting antenna and the at least one receiving antenna are fixedly embedded in the cascadable radar element.

3. The cascadable radar element according to claim 1, wherein the at least one transmitting antenna and/or the at least one receiving antenna are arranged adjacent to an edge of the corresponding radar element such that:

all transmitting antennas of two radar elements arranged adjacent to each other have the same distance to each other; and/or all receiving antennas adjacent to each other of two radar elements arranged next to each other have the same distance from each other.

4. The cascadable radar element according to claim 1, wherein the at least one transmitting antenna and/or the at least one receiving antenna are arranged adjacent to an edge of the corresponding radar element in such a way that a virtual antenna array of the radar element resulting from the arrangement of the transmitting and receiving antennas is larger than outer dimensions of the radar element and thus a direct and gapless arrangement of virtual antenna arrays is made possible by a corresponding arrangement of at least two radar elements.

5. The cascadable radar element according to claim 1, wherein the cascadable radar element further comprises a first transmitting antenna and a second transmitting antenna arranged at a distance from each other which corresponds to a number of receiving antennas multiplied by the distance between two adjacent receiving antennas, and wherein the cascadable radar element further comprises a plurality of receive antennas spaced apart by a distance equal to half a wavelength lambda of a respective radar signal.

6. The cascadable radar element according to claim 1, wherein the transmitting antennas and the receiving antennas are arranged along lines parallel to each other.

7. The cascadable radar element according to claim 1, wherein the transmitting antennas and the receiving antennas are arranged along lines perpendicular to each other.

8. The cascadable radar element according to claim 1, wherein the cascadable radar element further comprises a first transmitting antenna and a second transmitting antenna arranged at a distance from each other corresponding to half a wavelength lambda of a respective radar signal.

9. The cascadable radar element according to claim 1, further comprising a radar chip.

10. The cascadable radar element according to claim 1, further comprising:

a memory element configured to store acquired digital reflectance values;

a first digital interface arranged to output data of the memory element; and a second digital interface arranged to read digital data of a further radar element.

11. A radar measuring device, comprising:

a carrier; and an array of cascadable radar elements disposed on the carrier according to claim 1.

12. The radar measuring device according to claim 11, wherein the radar measuring device is a level radar measuring device which is configured to determine the level in a container.

13. The radar measuring device according to claim 11, wherein the radar measuring device is a distance or limit radar measuring device which is configured for process automation in an industrial or private environment.

14. The radar measuring device according to claim 11, wherein the cascadable radar elements are arranged in a 2-dimensional array.

15. The radar measuring device according to claim 11, wherein the carrier has a square shape.

16. A cascadable radar element for use in a radar measurement device for performing a digital beam transformation process including at least one transmitting antenna, which is integrated in the cascadable radar element, at least one receiving antenna, which is integrated in the cascadable radar element, an input terminal configured to cascade a plurality of interconnected cascadable radar elements, and an output terminal configured to cascade a plurality of interconnected cascadable radar elements, comprising:

circuitry configured to receive, at the input terminal, a first local oscillator signal; and output, at the output terminal, a second local oscillator signal, wherein the at least one transmitting antenna and the at least one receiving antenna are configured to acquire measurement data which is used to carry out the digital beam transformation process, wherein the cascadable radar element further includes:

a memory element configured to store acquired digital reflectance values;

an addressing circuit configured to assign a defined digital address to the radar element;

a digital bus interface arranged to connect the radar element to a digital bus; and an addressing logic configured to evaluate address information transmitted via the digital bus, and wherein the radar element is adapted to transmit data to and/or the memory element via the digital bus interface.

* * * * *